Patented Aug. 21, 1928.

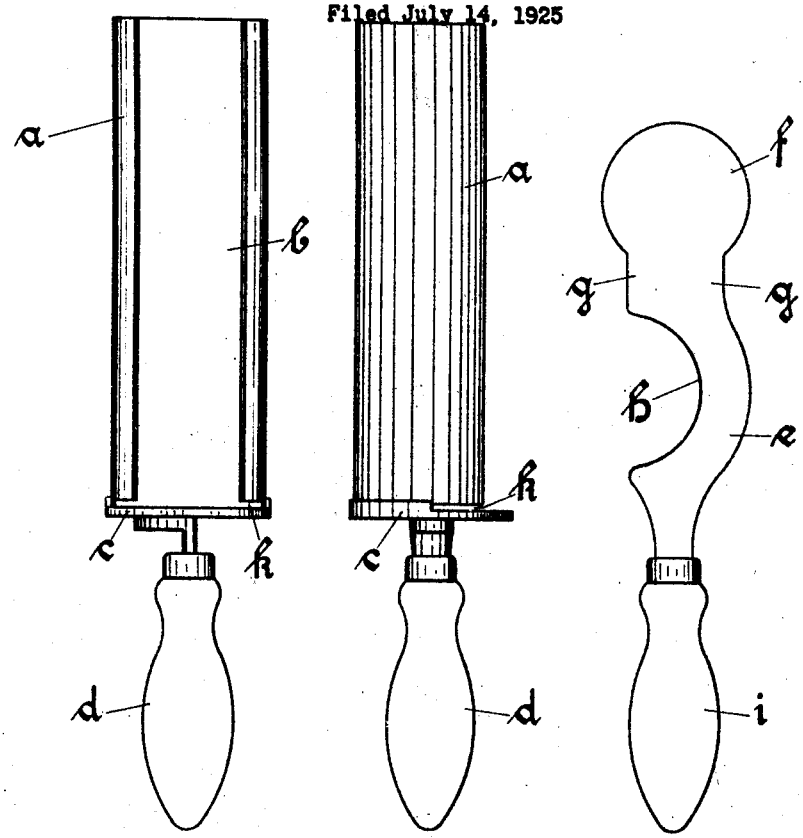

1,681,772

UNITED STATES PATENT OFFICE.

HANS KREIDEL, OF WIESBADEN, GERMANY.

GREASE-GUN-CHARGING DEVICE.

Application filed July 14, 1925, Serial No. 43,541, and in Germany July 17, 1924.

The invention relates to a device for charging grease into grease pumps or grease guns, of the known type, and consists of a longitudinally slotted tubular scoop open at the bottom for insertion into the pump press cylinder and a removing device guided in the slot thereof. The removing device also includes a plate portion having the same internal diameter as the scoop.

According to the invention the grease scoop, which is closed at the top has its cylindrical wall provided directly below said top with a transverse slot extending in both directions from the longitudinal slot a distance such that the entire length of said transverse slot is at least equal to the semi-circumference of the scoop in order to enable the plate portion of the removing device to be inserted laterally into the scoop when the latter is full. In addition to the plate portion the removing device is also provided with a recess corresponding with the external contour of the grease scoop, with which it is possible to easily clean the outer surface of the scoop by scraping away any grease which may cling thereto and by which the column of grease can be spread smoothly along the longitudinal slot of the scoop to form with the contents of the interior of said scoop a complete cylindrical column.

For the the purpose of filling the grease scoop the grease is pressed or forced into it from the bottom thereof. The transverse slot directly underneath the top permits the lateral insertion of the plate portion of the removing device into the scoop which has been uniformly filled with grease so that uniform quantities of grease can always be conducted into the cylinder of the grease pump or grease gun. The construction of the removing device having a scraper with a recess fitting the periphery of the grease scoop permits on the one hand the convenient and ready cleaning of the grease scoop by the removal of any grease adhering to the outside thereof, and on the other hand permits of smoothly spreading the column of grease and rendering this of uniform diameter throughout so that when driven out from the scoop it passes into the cylinder of the grease pump or grease gun without shock and of substantially circular section.

In the accompanying drawing is illustrated one example of construction according to the invention.

Figure 1 is a side view of the grease scoop as seen from the side thereof in which the longitudinal slot is provided.

Figure 2 is a transverse cross section.

Figure 3 is a side view taken at right angles to the view shown in Fig. 1.

Figure 4 is a transverse cross section of Fig. 3.

Figure 5 shows the removing device in side elevation, and

Figure 6 shows a perspective view of the device in use.

The scoop $a$ is open at the front end and is provided with a longitudinal slot $b$ and with a top $c$ to which is secured a handle $d$ so as to permit of the ready handling thereof. The dimensions of the scoop are such that it fits into the cylinder of the grease pump or grease gun to be filled, $e$ is the grease removing device which is provided with a plate $f$ adapted to fit neatly but slidably within the scoop $a$ and is also provided with a guide portion $g$ adapted to fit slidably within the longitudinal slot $b$. The removing device is further provided with a recess $h$ which corresponds in shape with the outer contour or periphery of the scoop. In order to grip and hold the removing device $e$ more easily it is also provided with a handle $i$ immediately adjacent to the top $c$ thereof the casing of the grease scoop is also provided with a transverse slot $k$ extending in both directions from the longitudinal slot $b$ to points substantially 90° from the center line of the longitudinal slot, so that the transverse slot extends not less than 180° about the periphery of the scoop to permit the plate shaped part $f$ of the removing device to be inserted laterally into the interior of the scoop after the latter has been filled. When filling grease pumps or grease gun cylinders the operation is as follows:

The full length of the grease scoop is inserted into the grease can and a column of grease is cut out and pressed into the interior of the scoop by turning it one or more times about its axis. The recess $h$ of the removing device $e$ is then placed upon the exterior of the scoop and moved longitudinally along all sides thereof to scrape off any excess grease and to smooth such grease as may protrude from the slot $b$ into a curved outer surface and thereby form a complete cylinder of grease. The plate end $f$ of the scoop is then inserted laterally into the transverse slot $k$ and the scoop is now inserted to its full length into the open cylinder of the grease pump or grease gun. The removing device e is held or pressed with one hand against the open end of the cylinder of the pump or gun and the grease scoop is withdrawn by the other hand thereby transferring an uninterrupted column of grease from the scoop into the cylinder of the pump or gun (Fig. 6). As will be readily understood the insertion of the removing device e into the transverse slot k must be effected in such a manner that its guide portion g will aline with and fit into the longitudinal slot b of the scoop so that relative sliding movement between the removing device and scoop may occur when the scoop is withdrawn from the pump or gun cylinder.

Having thus described my invention what I claim as new and desire to secure by Letters Patent is:—

1. A device for filling grease into grease pumps or grease guns comprising a tubular scoop adapted to fit into the cylinder of the grease gun, said scoop being open at one end and closed at the other and having a longitudinal slot extending along the whole length thereof, said scoop also having a transverse slot adjacent its closed end and extending at least 180° about its periphery, and a discharging member having a portion thereof dimensioned to fit within said scoop and to be passed laterally into said scoop through said transverse slot, said member being further provided with a portion for engaging said longitudinal slot and to be guided thereby when said member and scoop are moved relatively and longitudinally of each other for the purpose of discharging the grease from the scoop into the cylinder of the grease gun.

2. A device for filling grease into the cylinders of grease guns comprising a scoop open at one end and closed at the other, said scoop having a longitudinal slot extending along the whole length thereof, the external diameter of the scoop corresponding with the internal diameter of said cylinder, said scoop having a transverse slot adjacent its closed end and extending equally on either side of said longitudinal slot and at least 180° about the periphery of said scoop, and a scraper adapted to be fitted into the transverse slot and guided by the longitudinal slot.

In testimony whereof I have signed my name to this specification.

HANS KREIDEL.